Aug. 12, 1969　　A. C. SHARTRAND ET AL　　3,461,329
GENERATOR WITH GAS COOLERS AND CYLINDRICAL-ELLIPTICAL
FRAME SECTIONS
Filed Feb. 5, 1968　　2 Sheets-Sheet 1

INVENTORS:
ALLAN C. SHARTRAND,
CHARLES H. HOLLEY,
JAMES B. ARCHIBALD,
BY *Robert J. Bird*
THEIR ATTORNEY.

INVENTORS:
ALLAN C. SHARTRAND,
CHARLES H. HOLLEY,
JAMES B. ARCHIBALD,

BY Robert J. Burt

THEIR ATTORNEY.

United States Patent Office 3,461,329
Patented Aug. 12, 1969

---

3,461,329
GENERATOR WITH GAS COOLERS AND CYLINDRICAL-ELLIPTICAL FRAME SECTIONS
Allan C. Shartrand, Scotia, and Charles H. Holley and James B. Archibald, Schenectady, N.Y., assignors to General Electric Company, a corporation of New York
Filed Feb. 5, 1968, Ser. No. 703,019
Int. Cl. H02k 9/10
U.S. Cl. 310—55                                   7 Claims

ABSTRACT OF THE DISCLOSURE

A dynamoelectric machine as a turbogenerator having cylindrical frame midsections and elliptical frame end sections. The added space near the ends of the ellipse major axis permits the use of fewer and larger hydrogen gas coolers. The generator may be erected at the site of use with either the minor or major ellipse axis in the vertical direction so as to provide vertical or horizontal gas coolers.

BACKGROUND OF THE INVENTION

The present invention is related to dynamoelectric machine frames in general and in particular to the outer frames of large dynamoelectric machines such as generators.

One of the limiting factors of generators currently being built is the factor of physical size. There is a limit to the diameter of a generator, beyond which it would not be possible to ship the machine by railroad. As these machines progress to larger and larger ratings, they become physically larger approaching such a size that the core diameter required plus a reasonable depth of space for coolant gas reaches the maximum diameter which can be shipped. Furthermore, as ratings increase, cooling capacity must increase and this requires either more or larger coolers for the removal of heat from the coolant gas. Such larger coolers aggravate the problem of physical bulk.

Accordingly, it is an object of the present invention to provide a dynamoelectric machine having a frame configuration permitting of increased machine capacity within dictated physical size limits.

Another object is to provide a dynamoelectric machine casing which will permit a construction with fewer gas coolers than would be required on prior art machines of similar rating.

Other objects, advantages and features of the present invention will become apparent from the following description of one embodiment thereof when taken in connection with the accompanying drawing.

SUMMARY OF THE INVENTION

The present invention is practiced in one form by a generator having an outer frame which is split into axial sections with each end section elliptical in cross section, being shorter in vertical dimension than in horizontal dimension. The elliptical shape, providing relatively larger volume in the side portion of the frame, permits the use of fewer and larger hydrogen coolers to provide cooling capacity for larger machine rating. The elliptical shape of the end sections, by being vertically shortened, facilitates their transportation.

DRAWING

Figure 1:
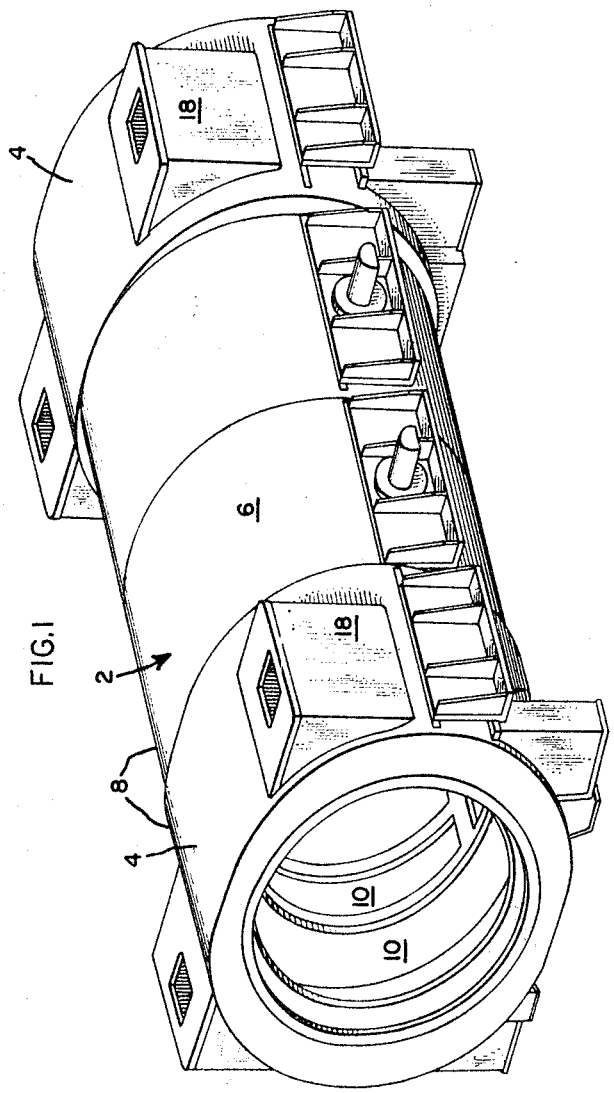
Figure 2:
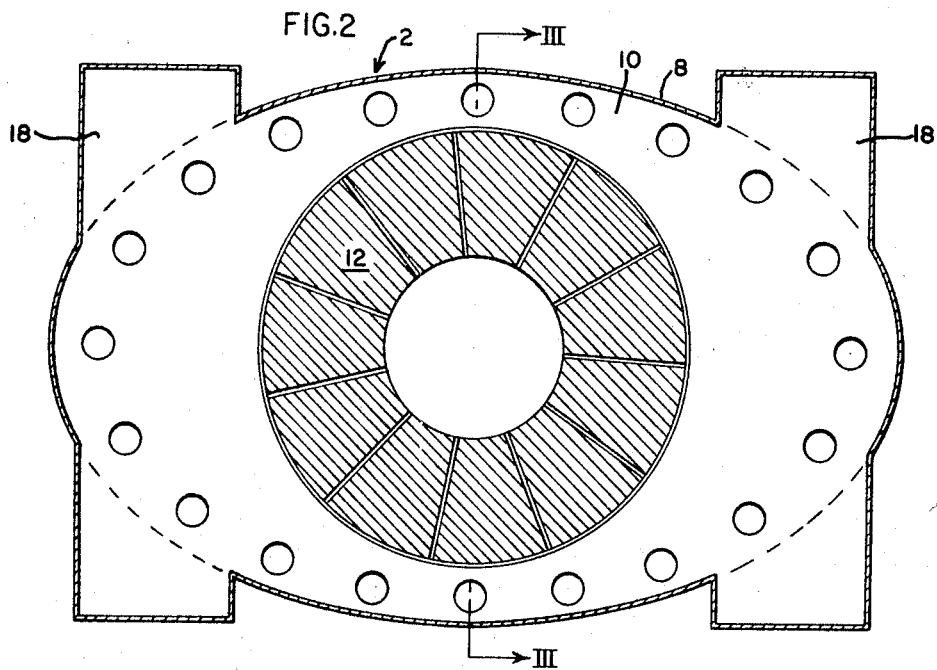
Figure 3:
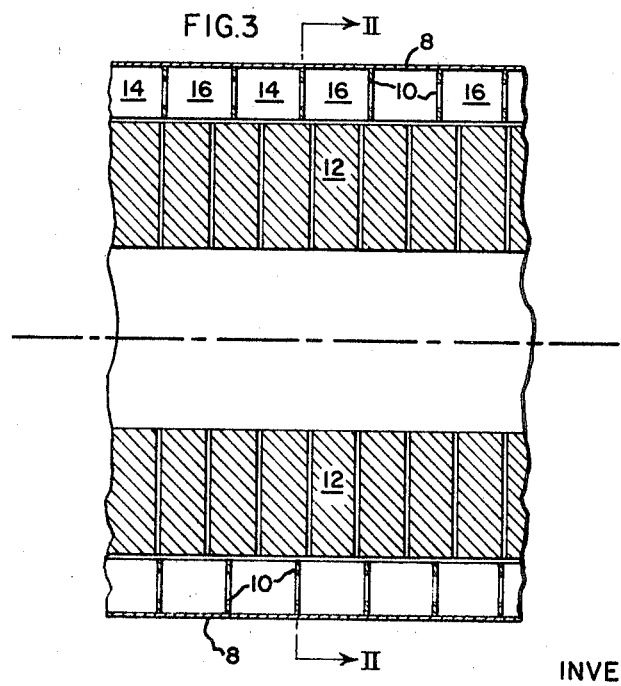

In the drawing:
FIG. 1 is a perspective view of a generator employing the present invention.
FIG. 2 is an end sectional view taken along line II—II of FIG. 3.
FIG. 3 is a partial side sectional view taken generally along line III—III of FIG. 2.

DESCRIPTION

In FIG. 1, a generator stator is generally shown at 2 and includes an outer frame having end sections 4 and a central section 6. Sections 4 and 6 are typically separate sections to be joined together at the site after shipment. The outer frame includes a wrapper plate 8 and a plurality of radially extending webs or section plates 10 extending inwardly from the wrapper plate 8. Wrapper plate 8 and section plates 10 define, with the stator core 12 (shown in FIG. 3), gas passages or spaces 14 and 16, being alternately inlet and outlet passages relative to the stator core 12, which are part of the overall generator coolant gas (hydrogen) circuit. The coolant gas circuit also includes a plurality of hydrogen coolers enclosed in cooling towers 18.

Central section 6 of generator 2 is circular in cross section. The end sections 4, however, have greater width than height. The resulting cross sectional shape of end sections 4 will be hereinafter referred to as elliptical, though it may or may not be a true ellipse. The only limitation on the extent to which the end sections may be widened (the ellipse lengthened) is that the generator casing is a pressure vessel, typically containing gas pressures of 45 p.s.i.g., 60 p.s.i.g., or higher Because of this, a curved rather than rectangular casing structure is called for Sections 4 are shipped by turning them 90° on a railroad car so that the axis is transverse to the tracks. Thus, width of section 4 is no factor in shipping. By not increasing the height dimension of end sections 4 to correspond to their increased width, that is, by resorting to the ellipse instead of a circular casing, the height does not exceed shipping limitations.

The greater radial depth at the side portions of end sections 4 provides accommodation for larger hydrogen coolers, while not adding to the height of the section. The coolers being larger, the machine may use fewer of them, such as the four shown, and locate them only in the elliptical end sections. This helps to reduce the bulk of the central section of the machine.

It will be apparent that by rendering the generator frame end portions elliptical, a combination of beneficial results are obtained. That is, in addition to the more desirable geometry for shipping considerations, the elliptical shape permits improved gas cooling capability or, conversely, gas cooling capability with fewer gas coolers. It thus, permits, larger rated machines to be built and shipped by present shipping methods.

Sections 4 and 6 might also be a single-piece frame. In this case, the entire frame would be elliptical. Such a machine may or may not include more coolers traversing its frame at the areas of its greatest radial dimension. Shipment of such a machine might be accomplished by positioning the frame with the major axis of the ellipse vertical. Thus width of the load, as shipped, is foreshortened.

It may be desirable, in the final assembly of a generator, to position it with the above-described elliptical frame or frame ends vertical; that is, with the major axis vertical. It will be apparent that such is within the contemplation and possibility of the present invention. Furthermore, the number of coolers shown is not material to the invention.

It may occur to others of ordinary skill in the art to make modifications of this invention which will remain within the concept and scope thereof and will not constitute a departure therefrom. Accordingly, it is intended that the invention be not limited by the details in which it has been described but that it encompass all within the purview of the following claims.

What is claimed is:
1. A dynamoelectric machine having a rotor and stator, said stator including a core and windings mounted within a frame, said frame and core defining therebetween a volume for the accommodation of coolant gas, said core having a circular cross sectional outline, said frame having, at least at its end sections, an elongated curvilinear cross section outline, said machine also including a plurality of coolant gas coolers in communication with said gas volume disposed at the end portions of said machine and perpendicular to the axis thereof, said coolers traversing said coolant gas volume in the area of its greatest radial depth.

2. A dynamoelectric machine having a rotor and stator, said stator including a core and windings mounted within a frame, said frame and core defining therebetween a volume for the accommodation of coolant gas, said core having a circular cross sectional outline, said frame comprising a plurality of axial sections and having at each end section thereof an elongated curvilinear cross sectional outline, said machine also including a plurality of coolant gas coolers in communication with said gas volume disposed at the end portions of said machine and perpendicular to the axis thereof, said coolers traversing said coolant gas volume in the area of its greatest radial depth.

3. A dynamoelectric machine according to claim 2 in which said curvilinear outline approximates an ellipse, the minor axis of said ellipse being vertical, and in which said coolers are four in number and vertically disposed.

4. A dynamoelectric machine according to claim 2 in which said curvilinear outline approximates an ellipse, the minor axis of said ellipse being horizontal, and in which said coolers are horizontally disposed.

5. A dynamoelectric machine having a rotor and stator, said stator including a core and windings mounted within a frame and core defining therebetween a volume for the accommodation of coolant gas, said core having a circular cross sectional outline, said frame having an elongated curvilinear cross sectional outline, said machine also including a plurality of coolant gas coolers in communication with said gas volume disposed at the end portions of said machine and perpendicular to the axis thereof, said coolers traversing said coolant gas volume in the area of its greatest radial depth.

6. A dynamoelectric machine according to claim 5 in which said curvilinear outline approximates an ellipse, the minor axis of said ellipse being vertical, and in which said coolers are four in number and vertically disposed.

7. A dynamoelectric machine according to claim 5 in which said curvilinear outline approximates an ellipse, the minor axis of said ellipse being horizontal and in which said coolers are horizontally disposed.

References Cited

UNITED STATES PATENTS

| | | | |
|---|---|---|---|
| D. 132,041 | 4/1942 | Hadley | D26—5 |
| 2,210,686 | 8/1940 | Ross | 310—258 |
| 2,453,358 | 11/1948 | Bertea | 310—254 |
| 2,707,242 | 4/1955 | Baudry | 310—57 |

WARREN E. RAY, Primary Examiner

U.S. Cl. X.R.

D26—5; 310—89, 258